H. L. WORTHINGTON.
RAT TRAP FOR USE ON SHIPS' HAWSERS.
APPLICATION FILED OCT. 26, 1910.

1,052,547.

Patented Feb. 11, 1913.

WITNESSES
W. P. Burke
John C. Sanders

INVENTOR
Hamilton L. Worthington
BY

UNITED STATES PATENT OFFICE.

HAMILTON LABATT WORTHINGTON, OF SYDNEY, NEW SOUTH WALES, AUSTRALIA.

RAT-TRAP FOR USE ON SHIPS' HAWSERS.

1,052,547. Specification of Letters Patent. Patented Feb. 11, 1913.

Application filed October 26, 1910. Serial No. 589,161.

*To all whom it may concern:*

Be it known that I, HAMILTON LABATT WORTHINGTON, a subject of Great Britain, residing at No. 6 Crown street, Sydney, in the State of New South Wales, Commonwealth of Australia, have invented certain new and useful Improvements in Rat-Traps for Use on Ships' Hawsers, of which the following is a specification.

This invention has for its object the providing of a trap for rats and mice for use upon the hawsers of ships with the object of intercepting and catching such vermin in their attempted passage from the ship to the shore or vice versa.

Figure 1:
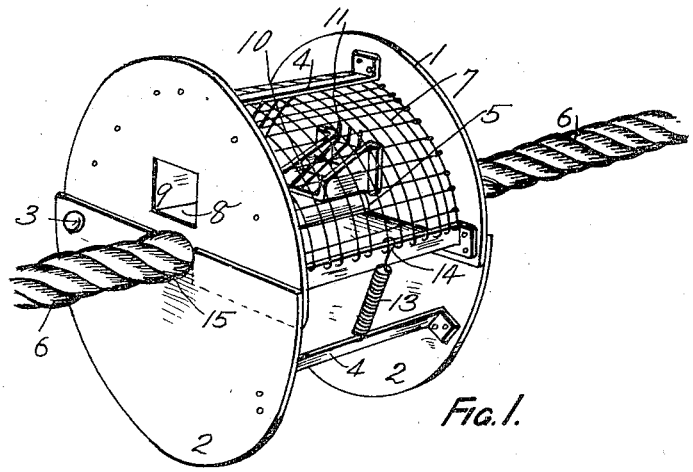
Figures 2, 3:
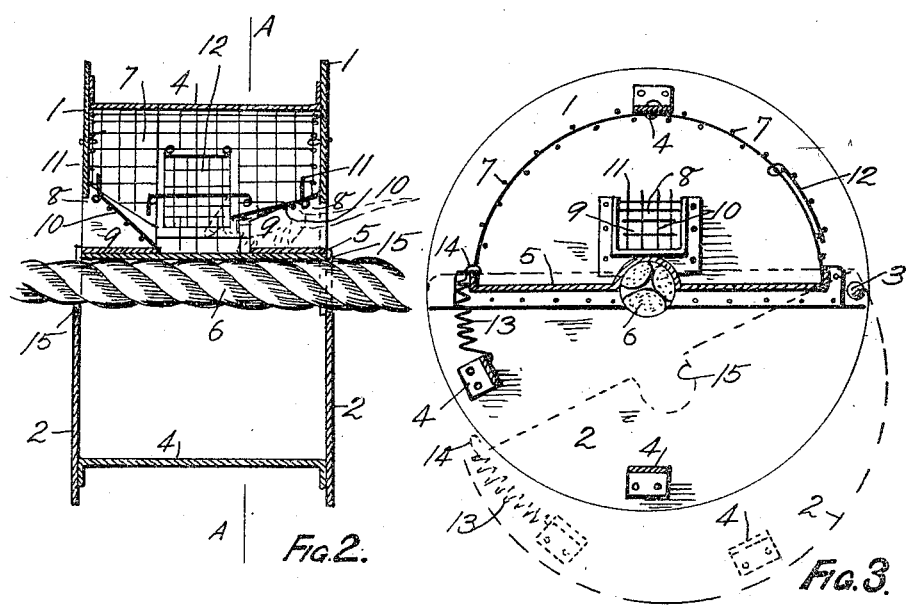

Referring to the annexed sheet of explanatory drawings Figure 1 is a perspective view of the trap shown fixed upon a ship's hawser. Fig. 2 a sectional side elevation of the same, and Fig. 3 a transverse section on line "A" "A" in Fig. 2, the dotted portion showing the cheeks or disks swung open for placing in position or removal.

The disks or cheeks are each divided into two parts 1 and 2 and each pair is hinged together at 3. The upper and the lower pair of disks are each braced together by stays 4 and a covering piece 5 is inserted between the two upper semi-disks 1 to act as a protection for the hawser 6. A rat proof wired inclosure 7 furnished with an aperture 8, race 9, and hinged drop door 10 at each end is secured to the upper semi-disks and forms the trap. Stops 11 on the drop doors 10 allow them to open to a predetermined point only. A door 12 for emptying purposes is formed in the side of the trap 7. When the trap is fixed in position on the hawser or hawsers the upper and the lower sections are held firmly in place by the coiled spring 13 the lower end of which is secured to the stay 4 and the hook 14 is clasped over one or other of the bars of the cage or is threaded into one of a series of holes formed in a plate fixed to the cage for that purpose.

It is evident that when the trap is to be fixed to hawsers of varying circumferences ready adjustment can be obtained with facility by means of the spring 13 drawing the upper and lower sections together until they "bite" securely on the hawser. To unship the trap from the hawser the hook 14 of the spring 13 is released and the upper and lower halves 1 and 2 of the cheeks or disks are swung open when it can then readily be removed.

In place of a coil spring being used to lock the upper and the lower portions together a lever with connecting links may be employed for the same purpose.

In carrying out the invention the trap, baited or unbaited, is secured to the hawser of the ship preferably at a point equidistant from the ship and shore. The rats or mice in their endeavors to reach either ship or shore have no other passage available than through the apertures 8 in which case having entered beyond the drop doors 10 they are prevented from returning to the cable 6.

When more than one cable is to be protected the aperture 15 is made either an oval or other convenient shape so that adjacent cables may be grouped together and clasped by the one trap.

Should it be undesirable to firmly fix the trap to a cable, owing to a tendency of the latter to turn or twist, due to the movement of the ship, the tension of the spring 13 is adjusted so that the trap loosely rides upon the cable, a counter-balancing weight being hung on the underside of the trap to keep the latter in an upright position.

In a modification of the invention a rat proof receptacle 7 can be secured upon the lower cheeks 2 similar in every particular to that mounted upon the upper cheeks 1, with trapped doors formed in cheeks 2. In this construction the upper and lower traps are duplicates of each other and can be used alternately for rat catching by rotating the disks or cheeks through one half revolution.

When the traps are to be used upon a cable the angle of which would cause either one or other of the trap doors, shown in the drawing, to open by gravity, I either weight those doors or substitute for them tapered spiked entrance runs such as are commonly used upon the well known form of fish traps.

What I claim as my invention and desire to secure by Letters Patent is—

1. A trap for the purpose specified comprising a rat or mouse proof receptacle mounted between a pair of substantially parallel cheeks or disks, said disks forming the end closures of the receptacle, each disk being formed of two parts hinged together and provided with openings and trap doors therefor.

2. A trap for use upon ships' hawsers comprising a pair of hinged and substantially parallel disks or cheeks between which is mounted a rat proof receptacle furnished with openings and trap doors therefor, said disks forming the end closures of the receptacle, each disk being formed of upper and lower sections, and a spring arranged to draw the upper and lower sections together for the purpose of gripping the hawser.

3. In a trap for use upon ships' hawsers, in combination, spaced end members in parallel relation to one another, said members forming the end closures of the trap, each of said members comprising two parts hinged to one another adjacent their outer edges, whereby the trap may be positioned on the hawser, an inclosure extending between said end members, said end members being provided with openings communicating with said inclosure, means associated with said openings for permitting animals to pass into said inclosure, but preventing them from passing out of the same, and means for holding the parts of the end portions together in gripping engagement with the hawser.

In testimony whereof I affix my signature in presence of two witnesses.

HAMILTON LABATT WORTHINGTON.

Witnesses:
C. G. HEPBURN,
A. E. GOODIN.